United States Patent
Docherty (10) Patent No.: US 8,594,939 B2
(45) Date of Patent: Nov. 26, 2013

(54) METHOD FOR CALIBRATING SEISMIC IMAGING VELOCITIES

(75) Inventor: Paul Docherty, Richmond, TX (US)

(73) Assignee: Fairfield Industries, Incorporated, Sugar Land, TX (US)

(*) Notice: Subject to any disclaimer, the term of this patent is extended or adjusted under 35 U.S.C. 154(b) by 159 days.

(21) Appl. No.: 12/688,330

(22) Filed: Jan. 15, 2010

(65) Prior Publication Data

US 2010/0185396 A1    Jul. 22, 2010

Related U.S. Application Data

(60) Provisional application No. 61/145,256, filed on Jan. 16, 2009.

(51) Int. Cl.
G01V 1/00 (2006.01)
G01V 1/28 (2006.01)
G06F 17/00 (2006.01)

(52) U.S. Cl.
USPC ............ 702/18; 702/14; 702/179; 367/50

(58) Field of Classification Search
USPC ................ 702/14, 18, 179; 367/50
See application file for complete search history.

(56) References Cited

U.S. PATENT DOCUMENTS

| | | | | |
|---|---|---|---|---|
| 4,635,238 A | * | 1/1987 | Gallagher et al. | 367/40 |
| 5,671,136 A | * | 9/1997 | Willhoit, Jr. | 702/18 |
| 6,785,612 B1 | * | 8/2004 | Zhang | 702/14 |
| 2003/0055568 A1 | * | 3/2003 | Zauderer et al. | 702/14 |
| 2006/0100785 A1 | * | 5/2006 | Laurent et al. | 702/14 |
| 2008/0080308 A1 | * | 4/2008 | Hornby | 367/15 |
| 2009/0303834 A1 | * | 12/2009 | Sengupta et al. | 367/73 |

OTHER PUBLICATIONS

MacKay et al.. "Calibrating Prestack Depth Migration Volumes with Well Control", 76th Annual International Meeting Society of Exploration Geophysicists, Expanded Abstracts, pp. 530-534, 2006.*
Thomsen, Leon, "Weak Elastic Anisotropy", Society of Exploration Geophysics, vol. 51, No. 10, Oct. 1986, pp. 1954-1966.*
Herkommer et al., Minimizing Misties in Seismic Data;Computers & Geosciences, vol. 20, No. 5, pp. 767-795.*

* cited by examiner

*Primary Examiner* — Alexander H Taningco
*Assistant Examiner* — L. Anderson
(74) *Attorney, Agent, or Firm* — Foley & Lardner LLP (57) ABSTRACT

A method for adjusting an isotropic depth image based on a mis-tie volume is provided. The method generally includes obtaining an isotropic velocity volume for a geophysical volume, obtaining an isotropic depth image of the geophysical volume, obtaining time-depth pairs at downhole locations in the geophysical volume, generating mis-tie values based on the time-depth pairs and the isotropic velocity volume, assigning uncertainties to the mis-tie values, generating a smoothest mis-tie volume that satisfies a target goodness of fit with the mis-tie values. Adjustment of the isotropic depth image may be achieved based on the mis-tie volume or a calibration velocity obtained from the mis-tie volume.

24 Claims, 8 Drawing Sheets

METHOD FOR CALIBRATING SEISMIC IMAGING VELOCITIES

CROSS-REFERENCE TO RELATED APPLICATIONS

This application claims benefit of U.S. provisional patent application Ser. No. 61/145,256, filed Jan. 16, 2009, which is incorporated by reference herein.

BACKGROUND

1. Field of the Invention

Embodiments of the present invention generally relate to techniques for performing seismic imaging.

2. Description of the Related Art

Isotropic velocity analysis followed by isotropic depth migration may result in large errors in seismic depth images where the earth is anisotropic. For example, in the Gulf of Mexico, it may not be unusual to observe mis-ties of 1,000 ft, or more, at depths below 10,000 ft. As a consequence, isotropic images may be frequently adjusted to tie more accurate data at wells. A common approach may use the isotropic velocities to convert the image to time, followed by conversion back to depth with a calibration velocity. A problem may be how best to estimate the calibration velocity; in particular, how to deduce the calibration velocity far from the nearest well.

Because of the sparsity of well locations, calibrations may be ambiguous. A clear pitfall to avoid may be the creation of a prospect that is not in the isotropic image and is not supported by the wells.

SUMMARY OF THE INVENTION

Certain embodiments of the present disclosure provide a method for performing seismic imaging. More specifically, to adjusting an isotropic depth image. Adjustment of the isotropic depth image may be achieved based on a mis-tie volume or a calibration velocity obtained from a mis-tie volume.

In one embodiment, the method includes obtaining an isotropic velocity volume for a geophysical volume, obtaining an isotropic depth image of the geophysical volume, obtaining time-depth pairs at downhole locations in the geophysical volume, generating mis-tie values based on the time-depth pairs and the isotropic velocity volume, assigning uncertainties to the mis-tie values, and generating a mis-tie volume that satisfies a target goodness of fit with the mis-tie values.

In another embodiment, the method includes obtaining an isotropic velocity volume for a geophysical volume, obtaining an isotropic depth image of the geophysical volume, obtaining time-depth pairs at downhole locations in the geophysical volume, generating mis-tie values based on the time-depth pairs and the isotropic velocity volume, assigning uncertainties to the mis-tie values, generating a smoothest mis-tie volume that satisfies a target goodness of fit with the mis-tie values, obtaining a calibration velocity from the mis-tie volume, generating a time image from the isotropic depth image, and generating a depth image from the time image using the calibration velocity.

In another embodiment, the method includes obtaining an isotropic velocity volume for the geophysical volume, obtaining an isotropic depth image of a geophysical volume, obtaining depth mis-tie values by identifying isotropic depth images with known true depths measured at wells, assigning uncertainties to the mis-tie values, generating a smoothest mis-tie volume that satisfies a target goodness of fit with the mis-tie values, and obtaining an estimate of the velocity normal to structure by taking the directional derivative with respect to time, in the direction normal to structure, of the mis-tie volume.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Anisotropy may cause large depth errors in images obtained with isotropic velocity analysis and depth migration. Typically, the errors may become apparent only where the seismic image intersects a well location (i.e., where true depths are measurable). Sparsity of well information may lead to ambiguity. It may be desirable to know what criterion to use to adjust the image at locations far from the wells and whether the prospect is real. The calibration problem may be posed in terms of a three-dimensional mis-tie function, (e.g., in terms of the difference in depth between uncalibrated and calibrated images). By means of regularization, a mis-tie volume may be obtained. The mis-tie volume may produce an acceptable fit at the wells but may not introduce unnecessary structure into the calibrated image. Differentiation of the mis-tie volume with respect to time may yield a calibration velocity.

Given the isotropic velocities, the problem may be posed in terms of a three-dimensional mis-tie function, (i.e., in terms of the depth difference between isotropic and calibrated images). Data for the problem may be vertical travel times and corresponding depths, either from check-shots or from interpreted formation tops. By regularizing mis-tie directly, a desirable featureless update to the isotropic image may be sought. The update may fit the data at the wells. The fit may take into account uncertainty in the data.

The method may produce a mis-tie volume which may be used to adjust the isotropic image. Equivalently, the time derivative of mis-tie may yield a calibration velocity to be applied as described earlier. For the case of polar anisotropy, the calibration velocity may be viewed as an estimate of the velocity of vertically propagating waves in the earth. As such, it may be a useful starting point for further estimation of anisotropic earth parameters.

Figure 1:
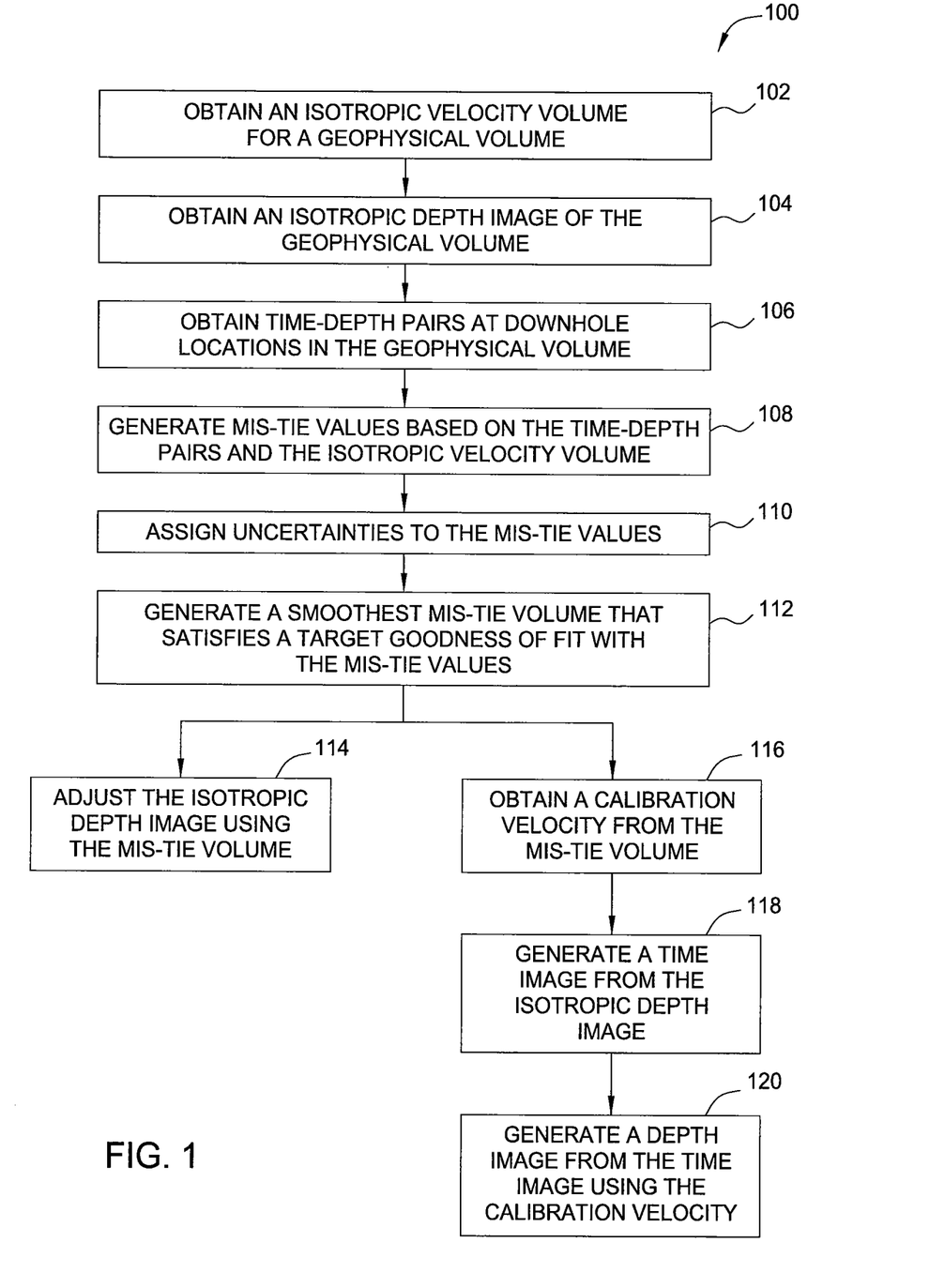
FIG. 1 is a flow diagram of example operations for adjusting an isotropic depth image, in accordance with certain embodiments of the present invention.

FIG. 1 is a flow diagram of example operations 100 for adjusting an isotropic depth image, in accordance with certain embodiments of the present invention.

The operations may begin, at step 102 by obtaining an isotropic velocity volume for a geophysical volume of interest. At 104, an isotropic depth image of the geophysical volume may be obtained. At 106, time-depth pairs at downhole locations in the geophysical volume may be obtained. At 108, mis-tie values may be generated based on the time-depth pairs and the isotropic velocity volume. At 110, uncertainties may be assigned to the generated mis-tie values. These uncertainties may be assigned in order to take into account measurement errors in the quantities used to generate the mis-tie values. At 112, a smoothest mis-tie volume may be generated. The mis-tie volume thus generated, when used to adjust the isotropic depth image, may not introduce undesirable structure into the image. Furthermore, the mis-tie volume generated may satisfy a target goodness of fit with the mis-tie values previously generated.

At 114, the isotropic depth image obtained at 104 may be adjusted using the generated mis-tie volume. Another way of adjusting the isotropic depth image may be to use a calibration velocity obtained from the mis-tie volume, at 116. The mis-tie volume may be differentiated to obtain the calibration velocity. The calibration velocity thus obtained may be an estimate of the velocity of vertically propagating waves in the geophysical volume. At 118, a time image may be generated from the isotropic depth image. At 120, a depth image may be generated from the time image using the calibration velocity obtained from the mis-tie volume. This depth image may be equivalent to the adjusted image obtained at 114.

Definition of Mis-Tie

Let $V_0(x,y,t)$ be the (unknown) vertical wave speed in the earth and $V_{iso}(x,y,t)$ the wave speed obtained from isotropic velocity analysis. Starting at surface location $(x,y,0)$, propagation along a vertical path for time t may give $$z(x,y,t) = \int_0^t V_0(x,y,\tau) d\tau \quad (1)$$

as the depth reached in the earth, and $$z_{iso}(x,y,t) = \int_0^t V_{iso}(x,y,\tau) d\tau \quad (2)$$

as the corresponding depth in the isotropic model. The function $m(x,y,t)$ may be introduced to describe the discrepancy, or mis-tie:

$$m(x,y,t) = z_{iso}(x,y,t) - z(x,y,t) \quad (3)$$

Differentiation with respect to time may produce $$\frac{\partial m(x,y,t)}{\partial t} = V_{iso}(x,y,t) - V_0(x,y,t) \quad (4)$$

Described below is a method for estimating $m(x,y,t)$ given its value at a sparse distribution of points. If $V_{iso}$ is assumed known, equation (4) may then give an estimate of $V_0$. The estimate may be the calibration velocity. Typically, the calibration velocity may inherit high-frequency lateral variations from $V_{iso}$, while the mis-tie derivative may supply a long wavelength adjustment (See "Calibrating prestack depth migration volumes with well control": 76th Ann. Internat. Mtg., Soc. Expl. Geophys., Expanded Abstracts, 530-534). It may be noted that where $V_{iso}$ is determined using short-offset data, an approximation for an anisotropic parameter δ may follow directly from equation (4) and the relationship $$V_{iso}(x,y,t) \approx V_0(x,y,t)(1+\delta(x,y,t)) \quad (5)$$

from "Weak Elastic Anisotropy": Geophysics, 52, 1954-1966.

It may also be noted that in the case of tilted transverse isotropy, the time derivative may be taken as a directional derivative normal to structure. In this case, the mis-tie values may be obtained, for example, from direct correlations between isotropic depth images and known markers in wells (formation tops). The resultant velocity $V_0$ may be the seismic velocity in the direction normal to structure.

An Example Method for Adjusting an Isotropic Depth Image

Given, at each of M locations $(x_i,y_i,z_i)$, the travel time $t_i$ for vertical propagation from the earth's surface, a quantity $d_i$ may be defined as described below.

$$d_i = z_{iso}(x_i,y_i,t_i) - z_i \quad (6)$$

Next a vector m of length N may be introduced to parameterize mis-tie throughout the volume $(x,y,t)$. (Elements of m may, for example, be values of mis-tie on a regular grid.) Interpolating to obtain the mis-tie at $(x_i,y_i,t_i)$ and equating to $d_i$ may produce $$d_i = a_i^T m, \; i=1,\ldots,M \quad (7)$$

Here, $a_i$ may be a vector of interpolation coefficients. In matrix notation equation (7) may become $$d = \underline{A} m \quad (8)$$

where $a_i^T$ may now be the i th row of matrix $\underline{A}$.

All of the measured quantities in equation (6), namely $x_i$, $y_i$, $z_i$ and $t_i$, may be subject to measurement error, the aggregate effect of which may be expressed as an uncertainty, $\sigma_i$, in the i th datum $d_i$. The uncertainties may be assigned to equation (8) in the form of weights, using the matrix $$\underline{W} = diag(1/\sigma_i):$$

$$\underline{W}d = \underline{W}\underline{A}m \quad (9)$$

In the calibration problem, it may often be the case that number of unknowns, N, may exceed the number of data, M, so that a unique solution to equation (9) may not exist. A key issue may therefore be one of regularization. In other words, it may be an issue of determining which of the many possible solutions to seek. It may be an important issue since misfit is a map between isotropic and calibrated depth images. The solution desired may be one that changes the isotropic image in the most cautious way while attaining a certain goodness of fit to the data. Cautious may mean smoothest. One example algorithm for generating smooth models from electromagnetic sounding data, may involve minimization of objective function O described below.

$$O = \lambda^2 \|Dm\|^2 + \|WAm - Wd\|^2 \quad (10)$$

where $\lambda$ may be a regularization parameter and $D$ may be an N×N matrix of second derivatives. The j th row of $D$ may be a finite difference approximation, centered at $m_j$, of the sum $$\frac{\partial^2}{\partial x^2} + \frac{\partial^2}{\partial y^2} + \frac{1}{v_{iso}^2(x, y, t)} \frac{\partial^2}{\partial t^2}. \quad (11)$$

Alternatively, it may be the sum $$\frac{\partial^2}{\partial x^2} + \frac{\partial^2}{\partial y^2} + \frac{\partial^2}{\partial z_{iso}^2} \quad (12)$$

applied to the mis-tie volume $m(x,y,z_{iso})$ obtained by mapping $m(x,y,t)$ from time to isotropic depth.

Minimization of O may yield the following linear system to be solved for m $$(\lambda 2^2 D^T D + (WA)^T (WA))m = A^T d \quad (13)$$

The parameter $\lambda$ may control the trade-off between smoothness of the solution and fit to the data, and it may be preferable to determine a suitable value for $\lambda$. One approach to selecting parameters is as follows. First, with a set equal to the standard deviation of the i th datum, the second term on the right hand side of equation (10) may be recognized as a quantity "chi-square:"

$$\chi^2 = \|WAm - Wd\|^2 \quad (14)$$

Following this, it may be assumed that the data contains independently random, zero mean, Gaussian errors. The expected value of $\chi^2$ may then be M, the number of data. Finally, equation (13) may be solved repeatedly with a series of values for $\lambda$. The solution that yields a $\chi^2$ closest to M may be chosen. This may be the smoothest possible solution for the target goodness of fit.

An Example Study

The following Figures illustrate how the technique presented herein may be applied to adjust an image.

Figure 2:
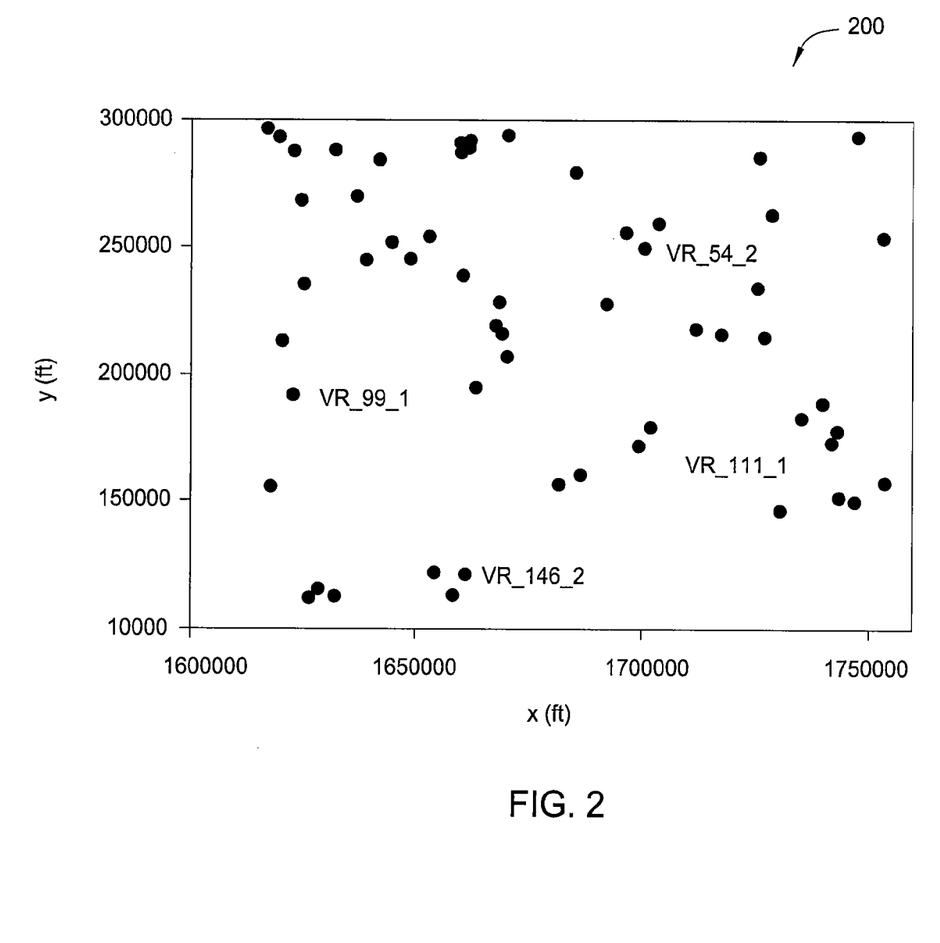
FIG. 2 illustrates the locations of 59 wells that provided check shots for an example study, in accordance with certain embodiments of the present invention.

FIG. 2 indicates locations 200 of the 59 wells that provided check shots for the study. Axes units are feet and the vertical axis points towards north. The area shown is approximately 1200 square miles. Velocities at the four labeled wells are plotted in FIGS. 6A-6D. Mis-ties were computed using a velocity model obtained from isotropic migration velocity analysis and tomography. The check shots yielded a total of 1846 mis-ties M in equation (7)).

Figure 3:
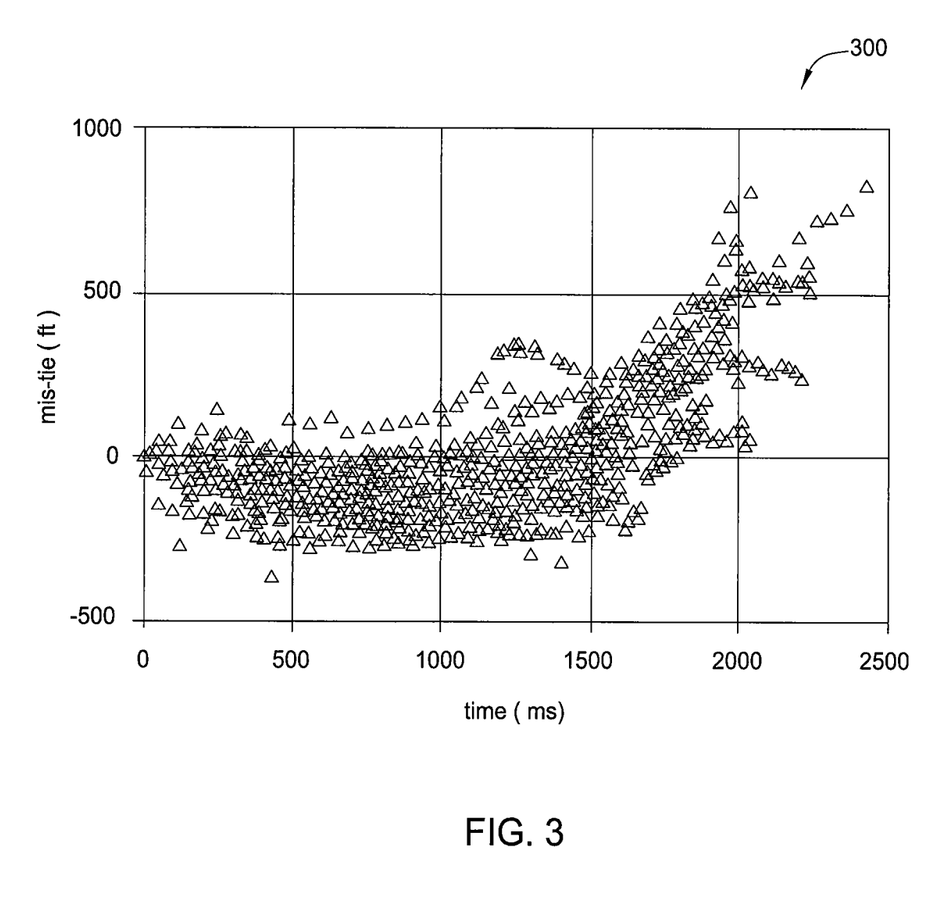
FIG. 3 illustrates mis-ties plotted as a function of time, in accordance with certain embodiments of the present invention.

FIG. 3 illustrates mis-ties 300 in feet plotted as a function of time. Positive mis-tie may indicate that the corresponding depth in an isotropic image may be greater than true depth in the earth (equation (3)). This may clearly be the case for times greater than about 1500 ms and may be characteristic of the occurrence of anisotropic, possibly pressured, shales. Shallow times may indicate the reverse trend, with mis-tie becoming increasingly negative down to about 500 ms.

It may be noted that within a depth range where the earth is isotropic the mis-tie trend tends to level out in the plot since $V_{iso}(x,y,t)$ and $V_0(x,y,t)$ may be the same in an interval of isotropy. This observation may be used to estimate uncertainty in the mis-tie values, as follows. In FIG. 3, the zone 500 ms≤t≤1000 ms may be interpreted to be approximately isotropic across the study area. In addition, it may be assumed that the shallow earth (t<500 ms) is laterally homogeneous. The effect of shallow anisotropy may then be a bulk shift of the mis-ties below 500 ms, so that scatter in the zone of isotropy may be attributed to measurement errors in the check shot data. For 500 ms≤t≤1000 ms the mis-ties in FIG. 3 may have a standard deviation of 70 ft. This value may be used for the elements of the diagonal matrix W in equation (9); that is, $\sigma_i = 70$, all i.

Figure 4:
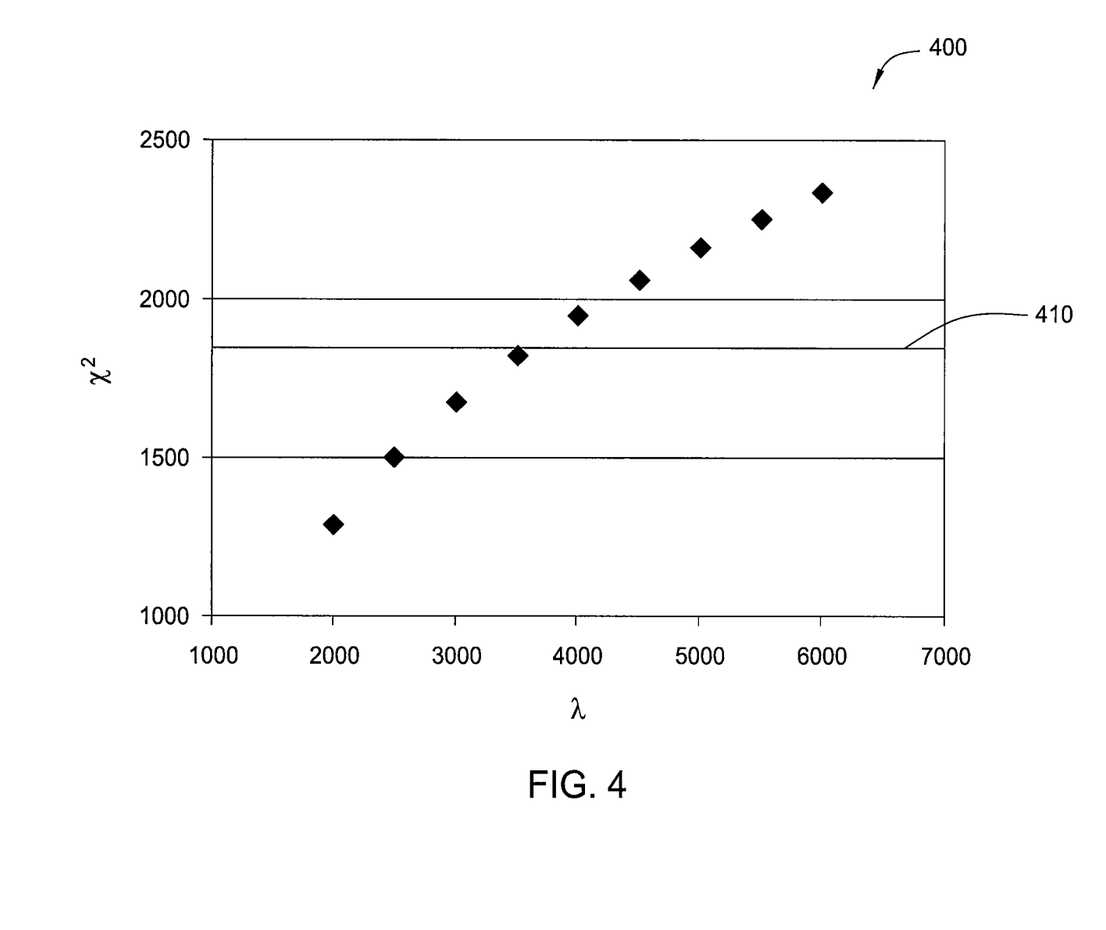
FIG. 4 illustrates trial values of a regularization parameter $\lambda$ and the corresponding chi-square values $\chi^2$, in accordance with certain embodiments of the present invention.

FIG. 4 illustrates a plot 400 of trial values of a regularization parameter lambda $\lambda$ and the corresponding chi-square values: $\chi^2$. Target $\chi^2$ of 1846 is indicated by the line 410. On solving equation (13) repeatedly with trial values of the regularization parameter $\lambda$, the chi-squares shown in FIG. 4 may be observed. The value $\lambda = 3500$ may give a chi-square closest to the target and the mis-tie vector m obtained from this inversion may be taken to be the solution. Differentiating m and inserting into equation (4) may give an estimate of $V_0$, (i.e., the calibration velocity).

Figure 5:
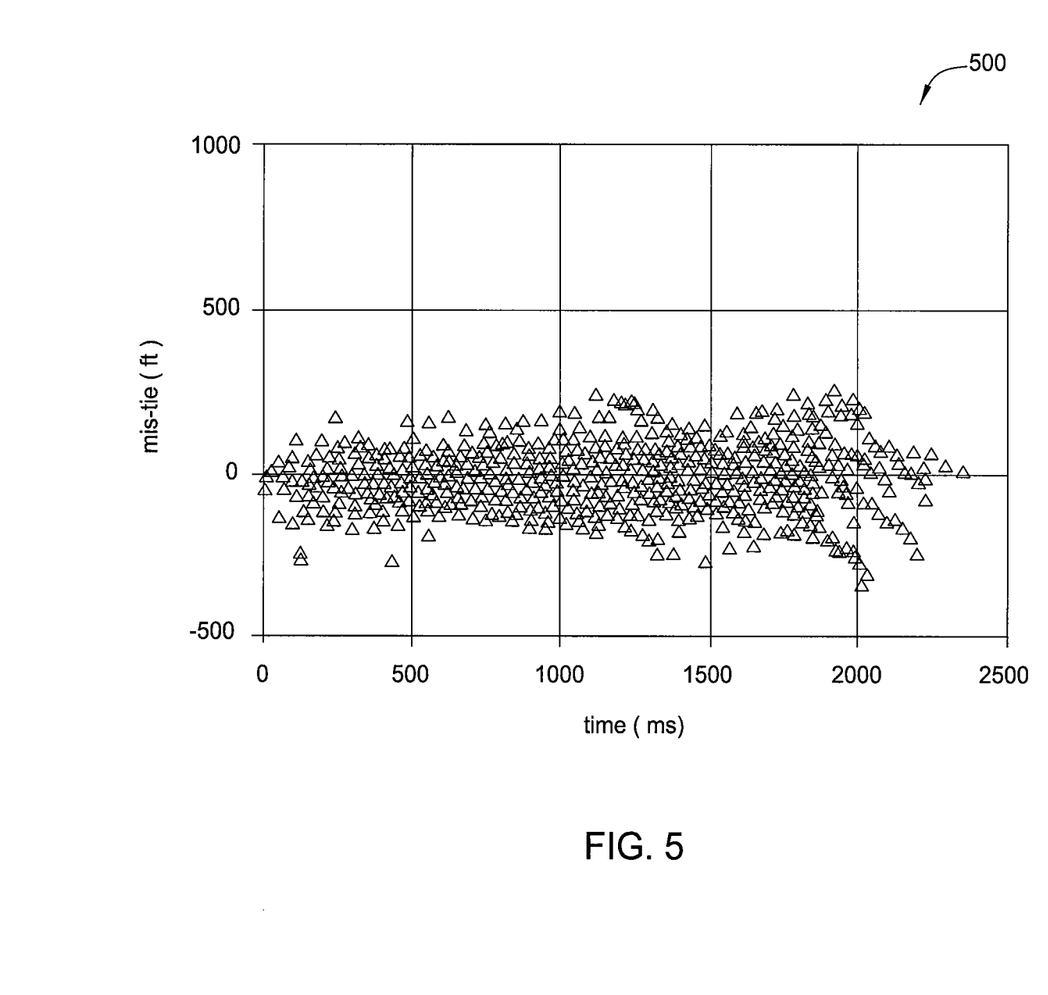
FIG. 5 illustrates the mis-ties in FIG. 3, after calibration, in accordance with certain embodiments of the present invention.

FIG. 5 shows the result of 500 of replacing $V_{iso}$ with the calibration velocity in the mis-tie calculation. In other words, FIG. 5 illustrates the mis-ties in FIG. 3, after calibration. The figure may be useful as a prediction of mis-ties in the calibrated image. The mean value of the mis-ties shown is −4 ft; standard deviation is 69 ft.

Figure 6A:
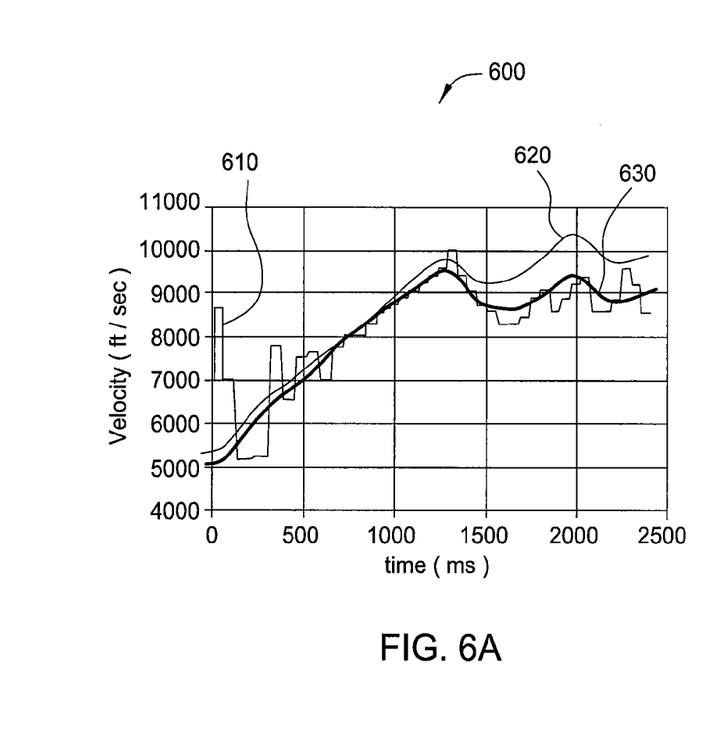
FIGS. 6A-6D illustrate plotted samples of the calibration velocity at the four well locations labeled in FIG. 2. in accordance with certain embodiments of the present invention.
Figure 6B:
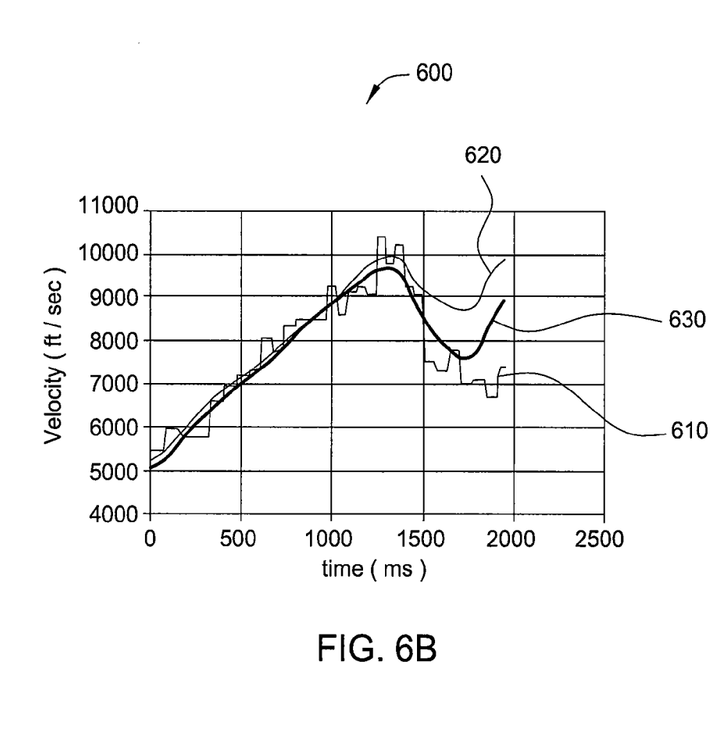
Figure 6C:
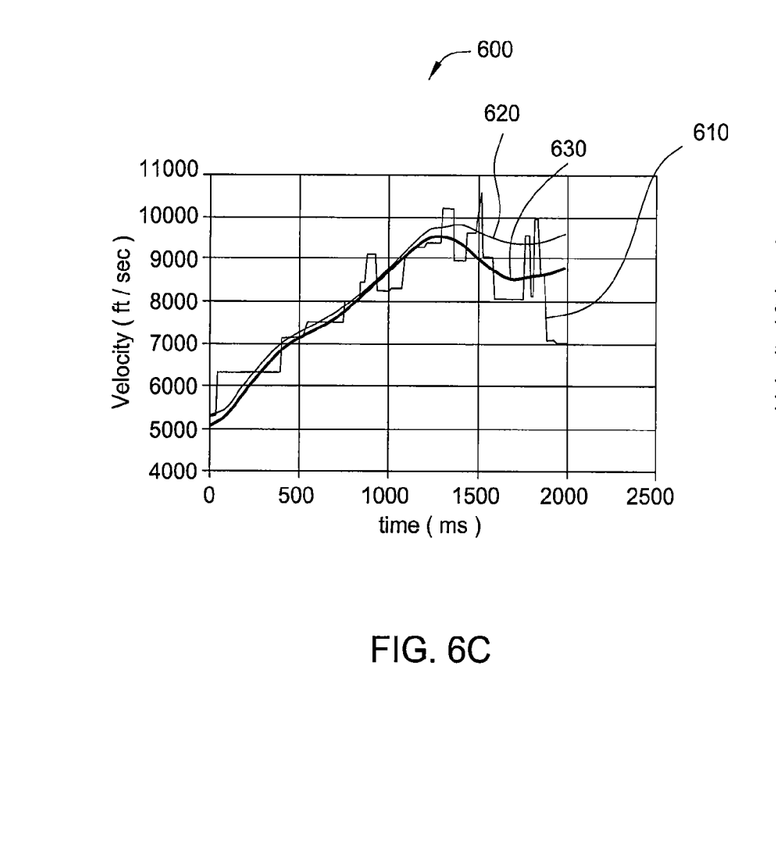
Figure 6D:
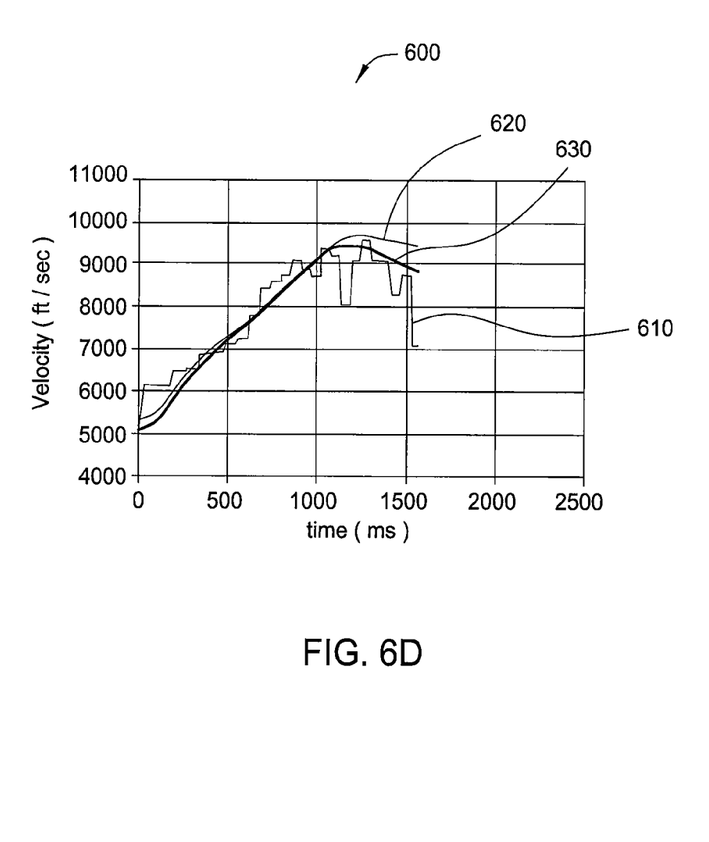

FIGS. 6A-6D illustrate plotted samples 600 of the calibration velocity 630 at the four well locations labeled in FIG. 2. FIG. 6A represents well location VR_99_1, FIG. 6B represents well location VR_146_2, FIG. 6C represents well location VR_54_2 and FIG. 6D represents well location VR_111_1. Also shown in the plots are the corresponding isotropic velocities ($V_{iso}$) 620, and interval velocities 610 computed directly from the check-shot data. The anomalously high check shot velocity near time zero in well location VR_99_1 shown in FIG. 6A suggests an erroneous datum correction in the MMS data. Consistent with FIG. 3, it may be noticed that the slower isotropic velocities at early times are followed by an intermediate zone of better agreement. A velocity inversion may occur at about 1300 ms; isotropic velocities at later times may be too fast.

Figure 7:
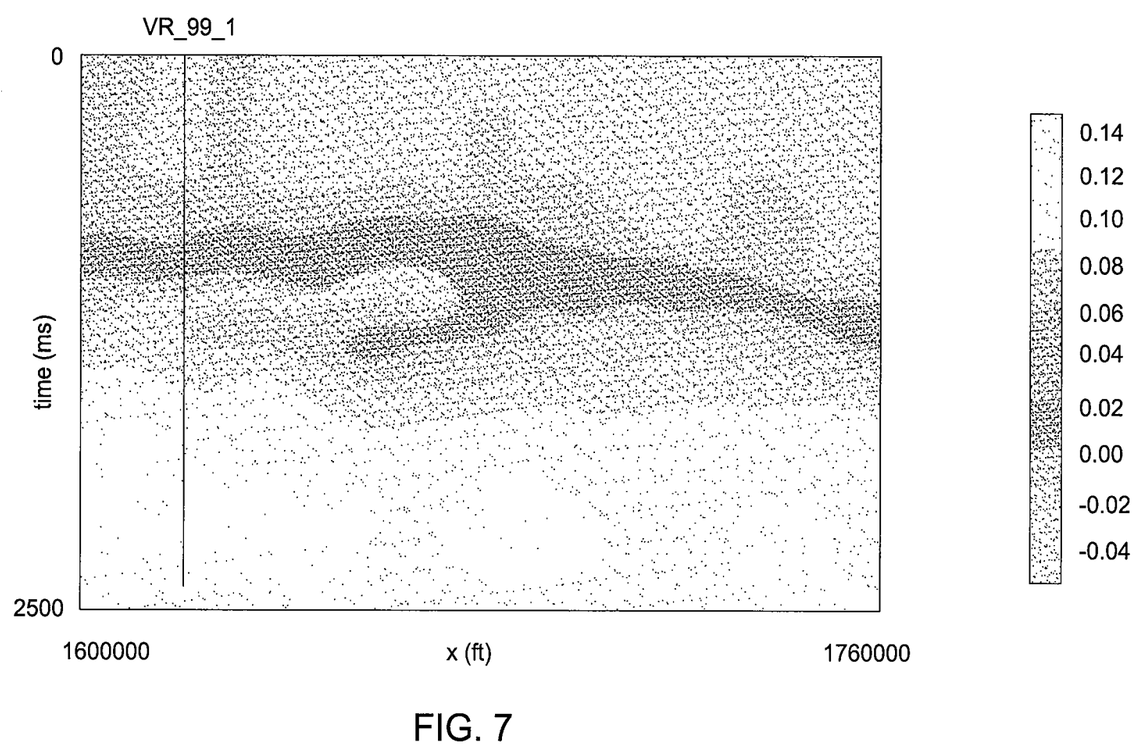
FIG. 7 shows anisotropic parameter $\delta$ along a West-East line through well location VR_99_1 (shown in FIG. 2).

FIG. 7 shows anisotropic parameter δ along an example West-East line through well location VR_99_1 shown in FIG. 2.

Of the many calibrations that fit the data, a method has been described that may produce the smoothest, or most featureless, update to the uncalibrated image. Key aspects of the method are: (i) the problem is posed in terms of mis-tie; (ii) data for the problem are mis-ties at wells; (iii) uncertainties in the data are taken into account; (iv) regularization is applied directly to a mis-tie volume; and (v) calibration velocity is obtained as the difference between isotropic velocity and the time derivative of the regularized mis-tie.

While the foregoing is directed to embodiments of the present invention, other and further embodiments of the invention may be devised without departing from the basic scope thereof, and the scope thereof is determined by the claims that follow.

The invention claimed is:

1. A method, comprising:
  obtaining an isotropic velocity volume for a geophysical volume;

obtaining time-depth pairs at downhole locations in the geophysical volume, the time-depth pairs corresponding to one or more wells located in the geophysical volume and comprising data indicative of at least one seismic survey;

generating, using a computer, depth mis-tie values based on the time-depth pairs and an isotropic depth image of the geophysical volume, the depth mis-tie values being computed according to the expression:

$$m(x,y,t)=z_{iso}(x,y,t)-z(x,y,t)$$

where $z_{iso}(x,y,t)$ is an isotropic depth based on the isotropic depth image, $z(x,y,t)$ is a depth, and $m(x,y,t)$ is a depth mis-tie;
assigning uncertainties to the depth mis-tie values; and
generating a mis-tie volume that satisfies a target goodness of fit with the depth mis-tie values.

2. The method of claim 1, further comprising:
obtaining an isotropic depth image of the geophysical volume; and
adjusting the isotropic depth image using the mis-tie volume.

3. The method of claim 2, wherein the adjusting the isotropic depth image further comprises:
obtaining a calibration velocity from the mis-tie volume.

4. The method of claim 3, further comprising:
differentiating the mis-tie volume to obtain the calibration velocity.

5. The method of claim 1, further comprising:
obtaining a calibration velocity from the mis-tie volume.

6. The method of claim 5, wherein the calibration velocity is an estimate of the velocity of vertically propagating waves in the geophysical volume.

7. The method of claim 5, further comprising:
obtaining an isotropic depth image of the geophysical volume;
generating a time image from the isotropic depth image; and
generating a depth image from the time image.

8. The method of claim 5, further comprising:
generating a time image; and
generating a depth image from the time image.

9. The method of claim 8, wherein the depth image is substantially equivalent to an adjusted isotropic image from the mis-tie volume.

10. A method, comprising:
obtaining an isotropic velocity volume for a geophysical volume utilizing data indicative of at least one seismic survey;
obtaining, using a computer, an isotropic depth image of the geophysical volume;
obtaining time-depth pairs at downhole locations in the geophysical volume, the time-depth pairs corresponding to one or more wells located in the geophysical volume based on the data indicative of the at least one measurement;
generating, using a computer, depth mis-tie values based on the time-depth pairs and an isotropic depth image of the geophysical volume, the depth mis-tie values being computed according to the expression:

$$m(x,y,t)=z_{iso}(x,y,t)-z(x,y,t)$$

where $z_{iso}(x,y,t)$ is an isotropic depth based on the isotropic depth image, $z(x,y,t)$ is a depth, and $m(x,y,t)$ is a depth mis-tie;
assigning uncertainties to the depth mis-tie values;
generating a smoothest mis-tie volume that satisfies a target goodness of fit with the depth mis-tie values;
obtaining a calibration velocity from the mis-tie volume;
generating a time image from the isotropic depth image; and
generating a depth image from the time image using the calibration velocity.

11. The method of claim 10, wherein the calibration velocity is an estimate of the velocity of vertically propagating waves in the geophysical volume.

12. The method of claim 10, wherein obtaining the calibration velocity further comprises:
differentiating the mis-tie volume.

13. The method of claim 10, further comprising:
adjusting the isotropic depth image from the mis-tie volume.

14. The method of claim 13, wherein the depth image is substantially equivalent to the adjusted isotropic image from the mis-tie volume.

15. A method, comprising:
obtaining an isotropic velocity volume for a geophysical volume using data indicative of at least one seismic survey;
obtaining, using a computer, an isotropic depth image of the geophysical volume;
obtaining, using a computer, depth mis-tie values by identifying isotropic depth images with known true depths measured at one or more wells, the depth mis-tie values being computed according to the expression:

$$m(x,y,t)=z_{iso}(x,y,t)-z(x,y,t)$$

where $z_{iso}(x,y,t)$ is an isotropic depth based on the isotropic depth image, $z(x,y,t)$ is a depth, and $m(x,y,t)$ is a depth mis-tie;
assigning uncertainties to the depth mis-tie values;
generating a smoothest mis-tie volume that satisfies a target goodness of fit with the depth mis-tie values; and
obtaining an estimate of a velocity normal to structure by taking the directional derivative with respect to time, in the direction normal to structure, of the mis-tie volume.

16. The method of claim 15, wherein the obtaining depth mis-tie values is based on the known true depths and the isotropic velocity volume.

17. The method of claim 15, further comprising:
adjusting the isotropic depth image using the mis-tie volume.

18. The method of claim 15, further comprising:
generating a time image from the isotropic depth images.

19. The method of claim 18, further comprising:
generating a depth image from the time image.

20. The method of claim 19, wherein the depth image is substantially equivalent to an adjusted isotropic depth image from the mis-tie volume.

21. The method of claim 1 or 10, wherein each depth mis-tie value is indicative of a deviation of a depth from a corresponding isotropic depth.

22. The method of claim 21, wherein the isotropic depth is determined based on an isotropic velocity analysis.

23. The method of claim 21, wherein each depth mis-tie value is indicative of a difference between the depth and the corresponding isotropic depth.

24. A method, comprising:
obtaining an isotropic velocity volume for a geophysical volume;
obtaining an isotropic depth image of the geophysical volume;
obtaining time-depth pairs at downhole locations in the geophysical volume, the time-depth pairs corresponding to one or more wells located in the geophysical volume and comprising data indicative of at least one seismic survey;

generating, using a computer, depth mis-tie values based on the time-depth pairs and the isotropic depth image, the depth mis-tie values being computed according to the expression:

$$m(x,y,t) = z_{iso}(x,y,t) - z(x,y,t)$$

where $z_{iso}(x, y, t)$ is an isotropic depth based on the isotropic depth image, $z(x, y, t)$ is a depth, and $m(x, y, t)$ is a depth mis-tie;

assigning uncertainties to the depth mis-tie values;

minimizing an objective function using a computer, the objective function being based on the depth mis-tie values and the uncertainties; and based on the minimized objective function, generating a mis-tie volume that satisfies a target goodness of fit with the depth mis-tie values.

* * * * *